United States Patent [19]
Zheng

[11] Patent Number: 5,515,359
[45] Date of Patent: May 7, 1996

[54] CREDIT ENHANCED PROPORTIONAL RATE CONTROL SYSTEM

[75] Inventor: Oin Zheng, Belmont, Mass.

[73] Assignee: Mitsubishi Electric Research Laboratories, Inc., Cambridge, Mass.

[21] Appl. No.: 297,270

[22] Filed: Aug. 26, 1994

[51] Int. Cl.$^6$ .............................. H04L 12/26; H04L 12/56
[52] U.S. Cl. .................. 370/13; 370/60.1; 370/94.2
[58] Field of Search .................................. 370/13, 17, 60, 370/60.1, 94.1, 68.1, 79, 84, 85.8, 94.2, 16, 16.1, 110.1; 340/825.5

[56] References Cited

U.S. PATENT DOCUMENTS

| | | | |
|---|---|---|---|
| 4,984,264 | 1/1991 | Katsube | 370/60 |
| 5,115,429 | 5/1992 | Hluchyj et al. | 370/94.1 |
| 5,119,367 | 6/1992 | Kawakatsu et al. | 370/60 |
| 5,119,372 | 6/1992 | Verbeek | 370/60 |
| 5,199,027 | 3/1993 | Barri | 370/60 |
| 5,265,091 | 11/1993 | van Landegem | 370/60 |
| 5,280,470 | 1/1994 | Buhrke et al. | 370/13 |
| 5,309,431 | 5/1994 | Tominaga et al. | 370/60 |

*Primary Examiner*—Wellington Chin
*Assistant Examiner*—Chau T. Nguyen
*Attorney, Agent, or Firm*—Robert K. Tendler

[57] ABSTRACT

A system for controlling traffic in a digital communication network to avoid data loss due to congestion utilizes an integrated credit-based and rate-based traffic control approach, and adjusts the rate at which data is transmitted from a source in accordance with feedback in the form of rate and credit adjustment information from a network reflecting the ability of the network to transmit data and the destination to receive data. In one embodiment, a source end system sends out resource management cells composed of various fields containing rate and credit information. The intermediate systems of the network and the destination end system update the corresponding fields according to their congestion status and send the resource management cells back to the source end system so that the source end system controls the data transmission accordingly. In a preferred embodiment, a source end system calculates an allowed cell rate from each of the fields in a resource management cell, and the minimum one among them is used to control data transmission.

6 Claims, 7 Drawing Sheets

CREDIT ENHANCED PROPORTIONAL RATE CONTROL SYSTEM

FIELD OF THE INVENTION

This invention relates to traffic control in a digital communication network and more particularly to a system for controlling data transmission to minimize data loss while accommodating bursty data traffic.

BACKGROUND OF THE INVENTION

In a transmission of data over a digital communication network, such as an asynchronous transfer mode or ATM network, problems arise when multiple sources send data cells or packets at widely varying rates through a switch node or link of the network at an aggregated rate which taxes the ability of that switch node or link to handle the data. Congestion occurs at the node of a network when data arrives at the node at a rate exceeding the rate at which the node can process and forward the data to other nodes. The excess data then accumulates in buffer storage at the node, which fills at a rate which is the difference between the arrival rate and the processing and forwarding rate. If the congestion persists for long periods of time, the buffer storage will be filled to maximum capacity and any additional data must be discarded.

In an effort to minimize such data loss, there are two types of systems which have been used at a source to prevent or inhibit excess data from entering the network. One such system is a rate-based system in which the rate at which the data is permitted to enter the network is adjusted via a feedback signal from a network reflecting the congestion of the network. This congestion of the network is typically denoted by an explicit forward congestion indication bit or an explicit rate in a form of Resource Management cells fedback to the source node. One such rate controlled system is described in an ATM Forum document #94-0735 entitled "Enhanced PRCA (Proportional Rate-Control Algorithm)" authored by Larry Roberts, August 1994.

A competing system for controlling data transmission uses a credit control approach which guarantees lossless transmission of data cells. The credits are generated starting at a destination node to reflect its ability to receive data. This credit is transmitted back to the next upstream node where this credit is interpreted and modified based on this node's ability to receive data. The process continues through each intermediate node back to the source where the credit at the source reflects all intermediate credits as well as the one from the destination. Typically the credits reflect the unused buffer space at each node. The source then interprets the credit as an indication of the amount of data that it can transmit into the network without any data loss due to congestion or buffer overflow. Note that data rate is not controlled, but the number of cells transmitted is controlled. One such credit controlled system is described in an ATM Forum document #94-0632 entitled "Credit-Based FCVC Proposal for ATM Traffic Management, Revision R2" authored by Doug Hunt, Warner Andrews, Jim Scott, Bob Simcoe, Jon Bennett, H. T. Kung, John Howard, Alan Chapman, and Ken Brinkerhoff, July, 1994.

Each scheme has its advantages and disadvantages. The rate-based scheme relies on end systems to do traffic control. Thus very little intelligence and participation are required on the part of switch nodes of ATM networks. Also, the rate-based paradigm is in accordance with the current standards for ATM traffic management to be implemented on network interface hardware. However, the issues of performance and its ability to react to congestion have been raised about the rate-based scheme. There is no analytical proof or real world experience showing that the rate-based scheme will be able to provide satisfactory performance and minimize cell losses of bursty traffic.

The credit-based scheme, on the other hand, has a solid proof that lossless transmission can be achieved. With its static buffer allocation algorithm, it can also achieve the maximum link bandwidth utilization. However, since the credit-based scheme requires coordination and active participation of all switches in a path, significant changes to the architecture of the existing ATM switches are needed. The switch implementation cost, in terms of processing power and buffer requirement, is also of concern. Thus a main concern about the credit-based scheme is whether or not the scheme is mature enough for wide spread implementation.

Since no single mechanism is believed by all to be shown by simulation and analysis to work well over the wide dynamic range of link speeds and distances and to meet the application requirements, performance, and cost of equipment goals, there is a need to allow both mechanisms be used in a network.

SUMMARY OF INVENTION

In order to accommodate both rate-based and credit-based traffic control mechanisms, an integrated system is provided for controlling traffic in a digital communication network to avoid data loss due to congestion utilizing a single mechanism incorporating features of both the rate-based systems and credit-based systems to feed back information from the destination to the source and control data transmission responsive to this feedback information.

Specifically, a system for controlling traffic in a digital communication network to avoid data loss due to congestion utilizes an integrated credit-based and rate-based traffic control approach, and adjusts the rate at which data is transmitted from a source in accordance with feedback in the form of rate and credit adjustment information from a network, in which the feedback information reflects the ability of the network to transmit data and the destination to receive data. In one embodiment, a source end system sends out resource management cells or RM cells composed of various fields containing rate and credit information. The intermediate systems of the network and the destination end system update the corresponding fields according to their congestion status and send the RM cells back to the source end system so that the source end system controls the data transmission accordingly. In a preferred embodiment, a source end system calculates an allowed cell rate from each of the fields in a RM cell, and uses the minimum one among them to control data transmission.

A main feature of the subject system is that different types of switch nodes in a network set different fields of RM cells to convey congestion information back to a source end system. Thus a source end system can make the maximum use of this rich feedback information and control cell transmission effectively. Also, traffic control scheme is automatically determined by switch nodes on the route instead of being negotiated at the time the connection is set up. For example, if a connection goes through rate-based switches only, then only rate related fields of RM cells are set. Consequently, cell transmission is controlled by a rate based scheme only. If a connection goes through credit based switches only, then only credit related fields are set and cell transmission is controlled by a credit based scheme only. Finally, if a connection goes through both rate based and credit based switches, both rate related and credit related fields are set, and cell transmission is controlled by an integrated rate based and credit based scheme.

In this way, the Subject System achieves a seamless integration of rate-based and credit-based traffic control mechanisms since no internetworking devices are required. The integration is also transparent to end users since end users are not bothered with the responsibility of negotiating a traffic control mechanism.

The subject system permits the gradual introduction of more sophisticated systems like credit based switch nodes on a node-by-node basis into existing networks without having to replace every switch node in the network. Additionally, the Subject System provides more information oil which to set transmission rate in existing rate-based networks. Most importantly, the Subject System does not add significant implementation complexity at a rate-based source end system.

BRIEF DESCRIPTION OF DRAWINGS

These and other features of the Subject Invention will be better understood in conjunction with the Detailed Description taken in accordance with the Drawings of which.

DETAILED DESCRIPTION

Figure 1:
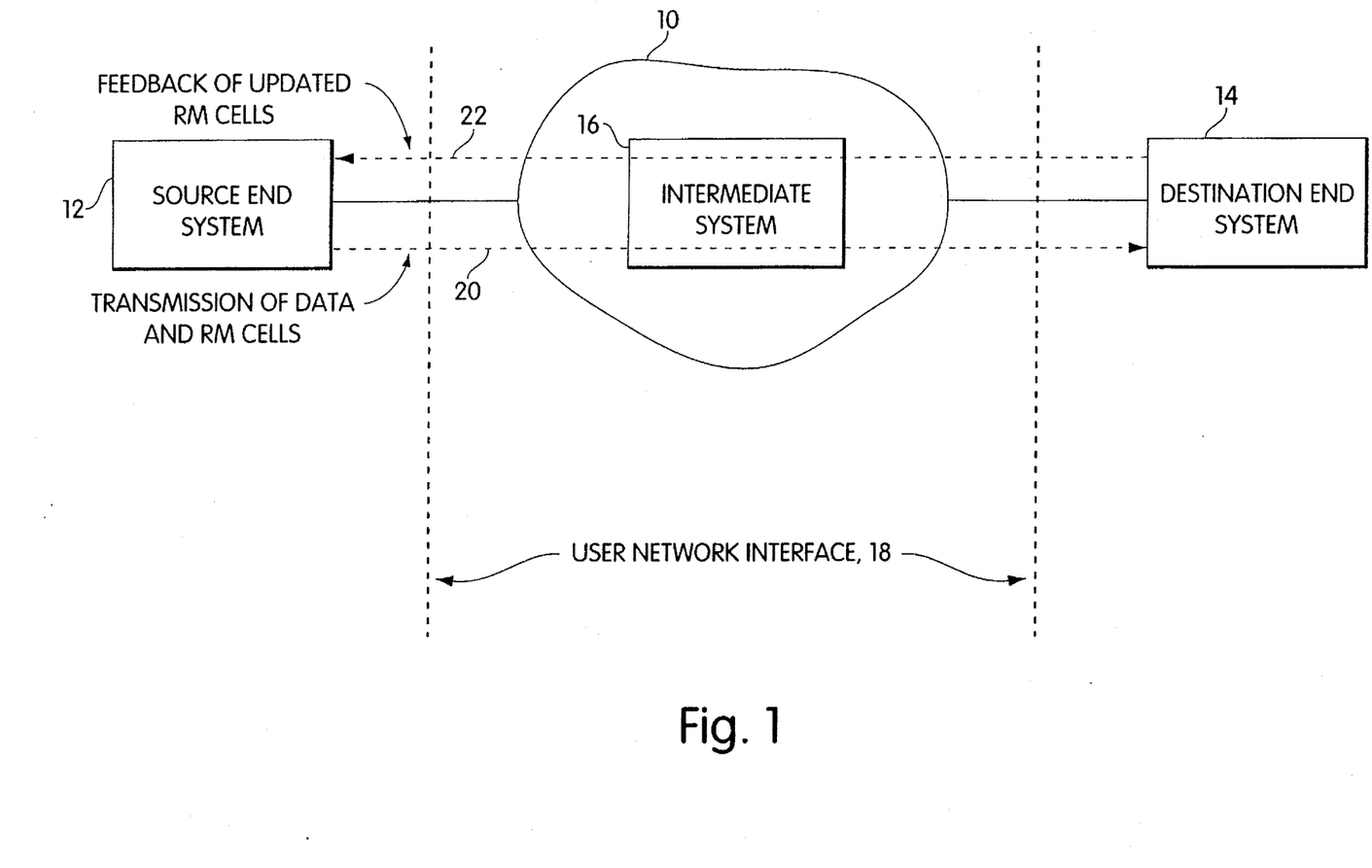
FIG. 1 is schematic diagram illustrating a network having a source end system from which data cells and RM cells are transmitted through an intermediate system in the network to a destination end system through user network interfaces, in which RM cells are modified and retransmitted back from a destination end system, forwarded and/or modified by an intermediate system, and received at the source end system and used to control the rate at which data cells are transmitted.

Referring now to FIG. 1, a network 10 is utilized to connect a source end system 12 at a source node to a destination end system 14 at a destination node via an intermediate system 16 at an intermediate node by providing a user network interface 18. The source end system transmits data cells along with RM cells for each virtual channel as indicated by dotted line 20 to the destination end system. A virtual channel or VC is a logical stream of data from one application in the source to one application in the destination with a virtual channel established by a connection path from a source node, through one or more intermediate nodes, to a destination node of the network. The RM cells contain the current states of the source end system, traverse through each intermediate system, which may record the state information and update some fields according to its congestion status, on its route to the destination end system. The destination end system 14 may update some fields in a received RM cell and send it back to the source end system 12 along the same route as indicated by the dotted line 22. Each intermediate system on the route may update stone fields in the RM cell according to its congestion status. When a RM cell traverses back to the source end system 12, the information contained in its fields is used by the source end system to adjust the cell transmission rate or limit cell transmission.

Figure 2:
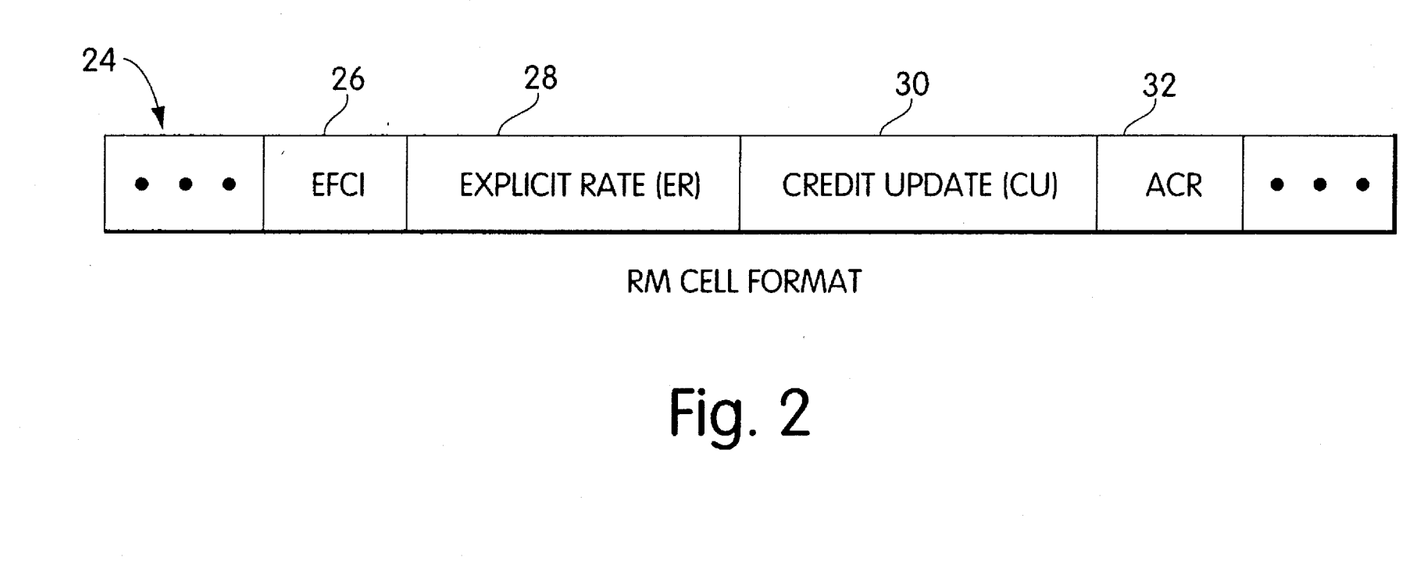
FIG. 2 is a drawing showing the fields in a RM cell used for conveying congestion information in which, explicit forward congestion indication, EFCI, is an explicit forward congestion indication bit that a switch can use to indicate a congestion status, Explicit Rate, ER, is a multi-bit field that a switch may use to set the transmission rate for the source end system, Credit Update, CU, is a multi-bit field that a switch may use to update the credit count at the source end system, and allowed cell rate, ACR, is a multi-bit field that a source end system may use to convey its allowed cell rate information to intermediate systems and destination end system.

Referring now to FIG. 2. In preferred embodiment, for each virtual channel, a source end system transmits one RM cell for every Nrm-1 of data cells sent, where Nrm is a parameter of the virtual channel. Among other things, a RM cell 24 contains an explicit forward congestion notification bit or EFCI bit 26, an explicit rate field or ER field 28, a credit update or CU field 30, and an allowed cell rate or ACR field 32. When sending a resource management cell, the source end system puts the current allowed cell rate of the virtual channel in the ACR field, the current sequence number of cells transmitted of the virtual channel in the CU field. It also sets the ER field to a peak cell rate PCR and EFCI to zero. As described in the proportional rate control algorithm, PRCA, an intermediate system or destination end system may update the EFCI bit from zero to one if it is in a congested state. It may also reduce the value of ER to explicitly reduce the transmission rate at the source.

Figure 3:
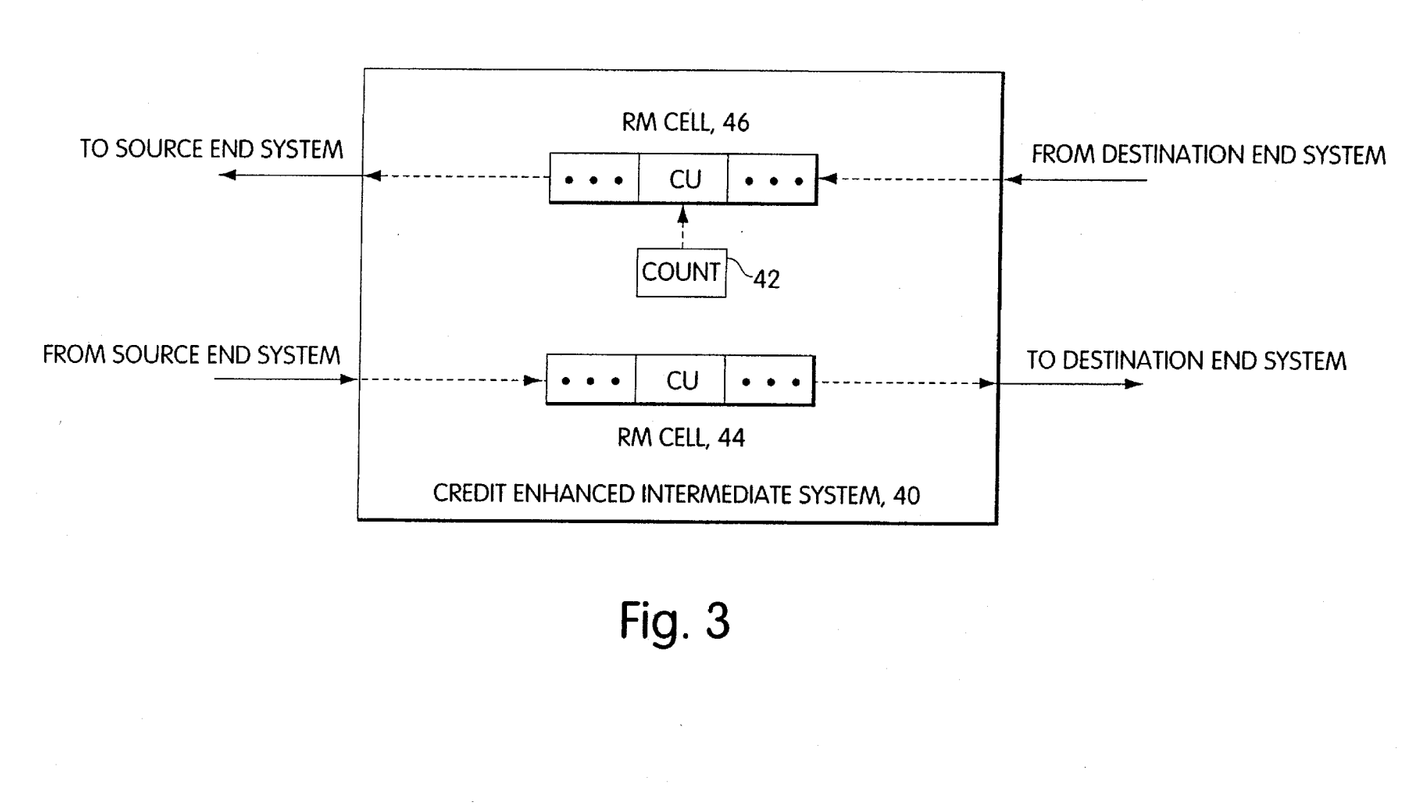
FIG. 3 is a schematic diagram illustrating one possible way that an intermediate system in FIG. 1 may use the CU field of RM cells to convey credit update information.
Figure 4:
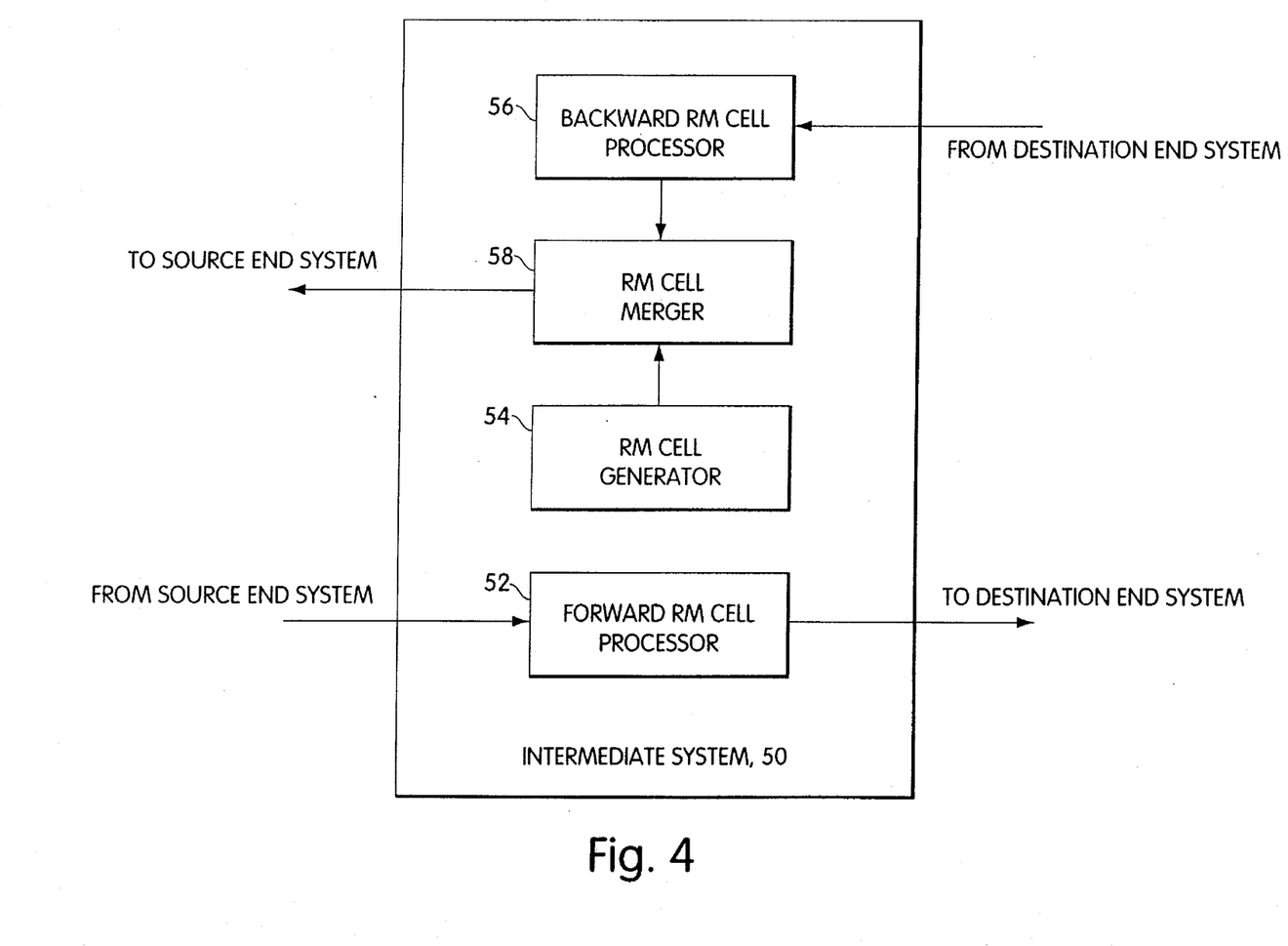
FIG. 4 is a block diagram illustrating a more general structure of an intermediate system in FIG. 1 which is capable of forwarding, generating, updating, and merging RM cells.

Referring now to FIG. 3, in one preferred embodiment, a credit enhanced intermediate system 40 maintains a cell count 42 for each virtual channel which records the total number of cells it has forwarded to the destination end system for the virtual channel. Each RM cell 44 received from the source end system is forwarded to the destination end system. For each RM cell 46 received from the destination end system, its CU field is retrieved which may be used to update the credit count for the virtual channel and control the transmission of cells to the destination end system, and the current count value is written into the CU field before the RM cell is sent back to the source end system. Referring now to FIG. 4, besides a forward RM cell processor 52 and a backward RM cell processor 56 which forward and update RM cells, an intermediate system 50 may also have an RM cell generator 54 to generate RM cells itself and send it back to the source end system to speed up the information feedback. To reduce the number of RM cells and save link transmission bandwidth, an RM cell merger 58 may be used which delays and merges RM cells.

Figure 5:
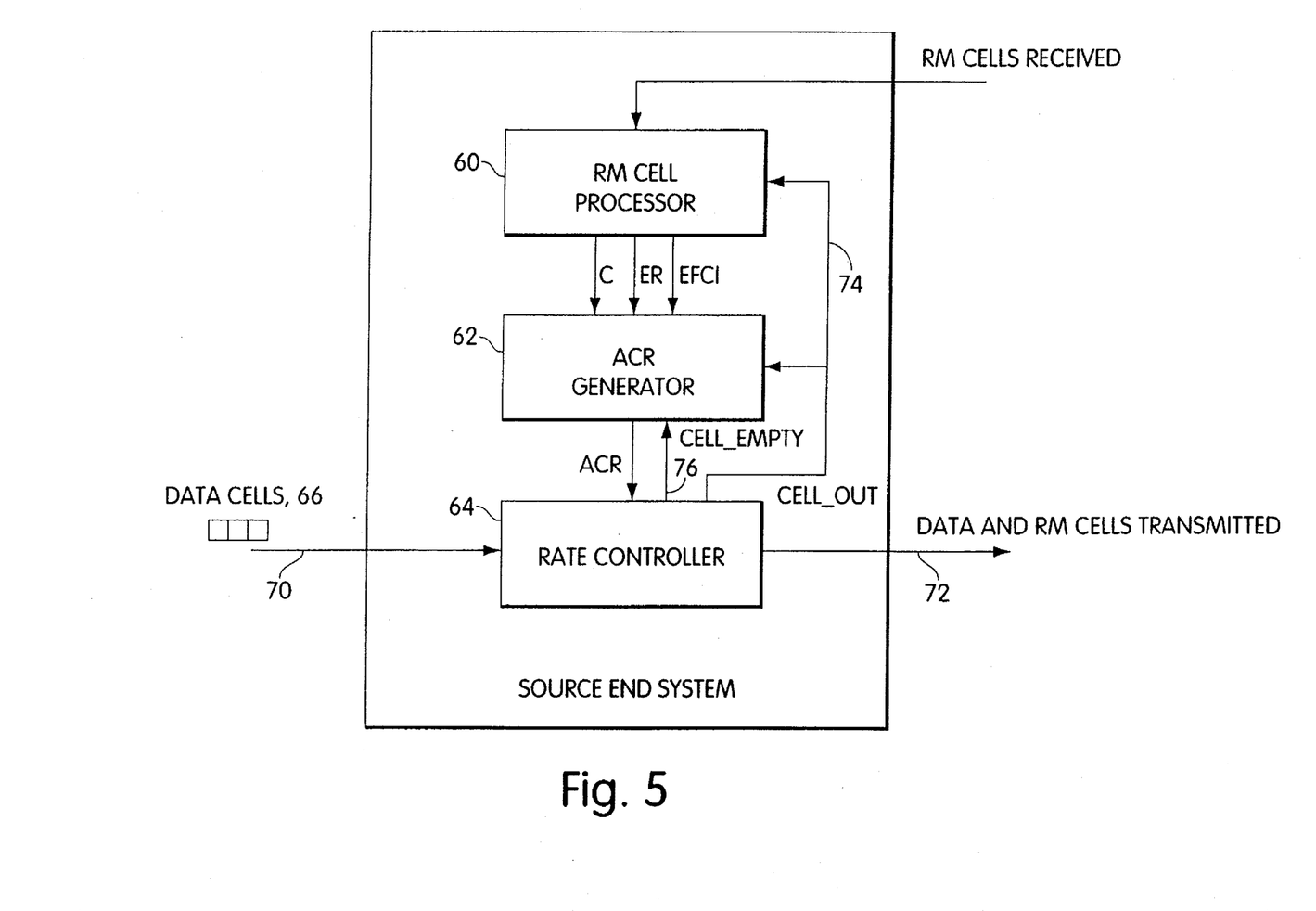
FIG. 5 is a block diagram of the source end system of FIG. 1 in which RM cells reflecting the state of the the network are applied to a RM cell processor which generates signals of credit count C, explicit rate ER, and explicit forward congestion indication EFCI applied to an allowed cell rate generator which in turn provides a signal corresponding to the allowed cell rate to a rate controller which governs the rate of transmission of data cells.

Referring now to FIG. 5, RM cells received from the network at a source end system are applied to RM cell processor 60 which extracts information from RM cells and generates signals C, ER, and EFCI which are in turn applied to ACR generator 62, with generator 62 providing an allowed cell rate value, ACR, to be applied to a rate controller 64 which controls the rate at which data cells 66 at the input link 70 to rate controller 64 are permitted to be transmitted over the output link 72. Each time a cell is transmitted, the fact of this transmission is indicated to both generator 62 and RM cell processor 60 via a "cell out" signal applied to line 74. If at the time a cell is to be transmitted, there is no cell waiting, a signal representing "empty cell" is coupled to generator 62 over line 76. In operation, RM cell processor 60 maintains a credit count C based on the RM cells received, diminished by the number of cells transmitted.

Figure 6:
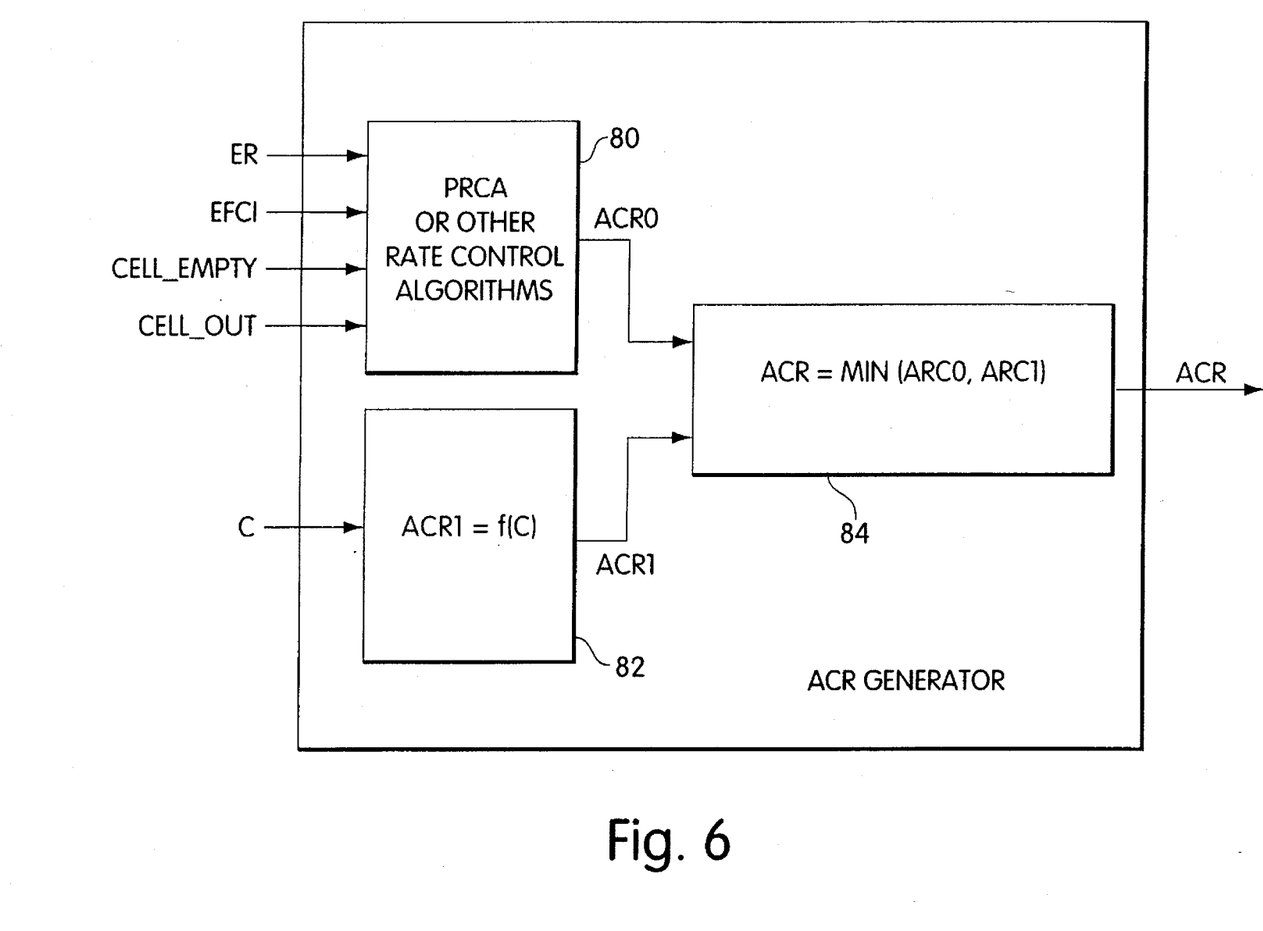
FIG. 6 is a block diagram illustrating the internal operation of an ACR generator in FIG. 3 in which incoming signals ER, EFCI, cell_empty, cell_out are converted to a cell rate ACR0 using a rate control algorithm such as the proportional rate control algorithm or PRCA, the credit signal C is converted to a cell rate ACR1 using a function f(), and the minimum of ACR0 and ACR1 is outputted as an allowed cell rate; and, FIG. 7 is a block diagram illustrating the destination end system of FIG. 1 in which incoming data cells are forwarded to a host system, not shown, and RM cells are transmitted back to the source end system via a RM cell retransmitter.

Referring now to FIG. 6, ACR generator 62 in FIG. 5 includes a module 80 executing a Proportional Rate Control Algorithm or some other rate control algorithms which converts signals ER, EFCI, cell_empty, and cell_out into a rate signal ACR0. A module 82 is also used which converts signal C into a rate signal ACR1 using a function f(). One possible selection of f() is a step function: f(C)= PCR if C is larger than 0, and f(0)=MCR or 0, where PCR is the peak cell rate and MCR is the minimum cell rate. Another selection is a linear function: f(C)=MCR+(PCR−MCR)C/Cmax, where Cmax is the maximum credit value. Module 84 then selects the minimum of ACR0 and ACR1 as ACR. The ACR generator described here is a key component that realizes the integration of rate control and credit control mechanisms.

Figure 7:
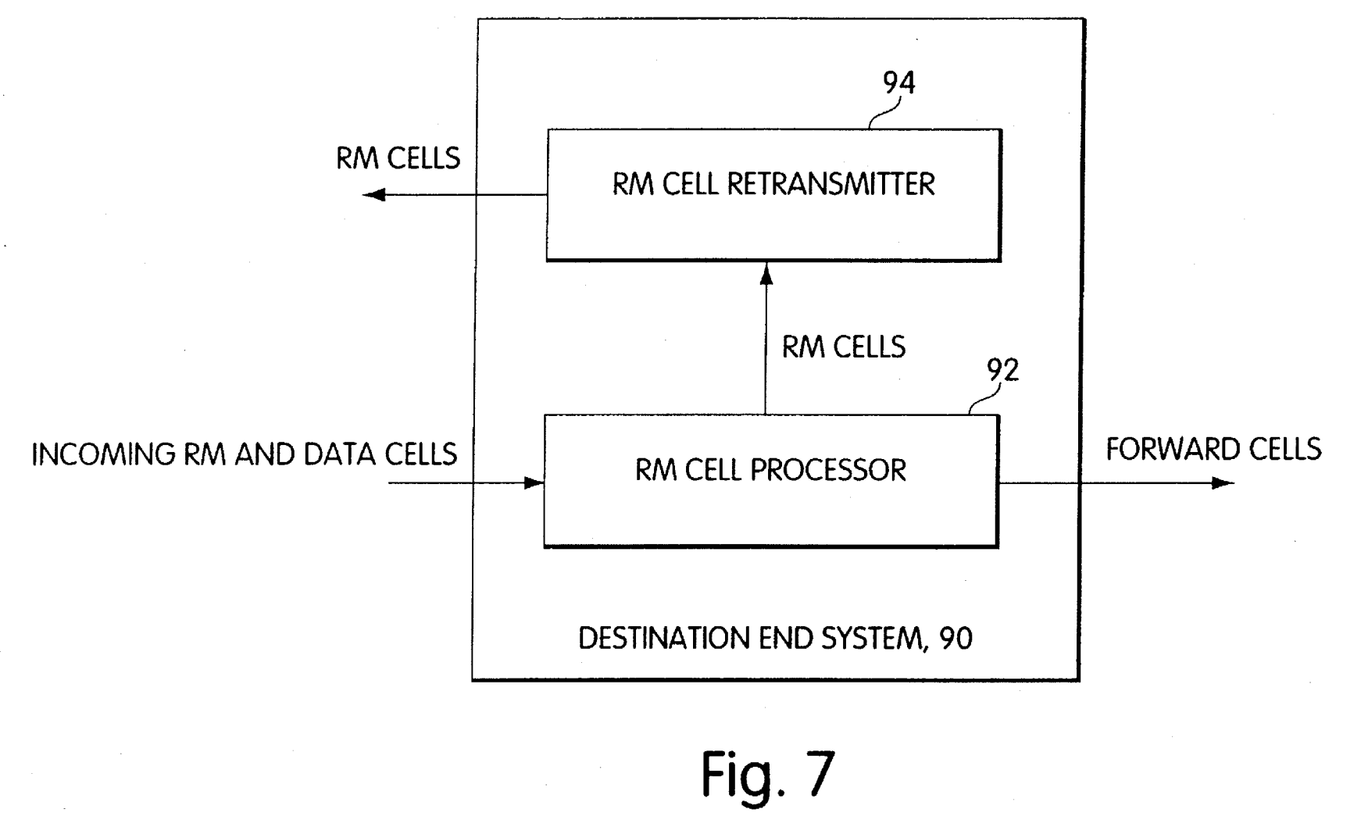

Referring now to FIG. 7, destination end system 90 includes a RM cell processor which identifies and updates incoming RM cells which are in turn forwarded to a RM cell retransmitter 94 sending RM cells back to the source end system. Similar to an intermediate system, a RM cell processor 92 at a destination end system 90 call simply forward each arriving RM cell to RM cell retransmitter thus acting as a simple destination end system, or modify various fields in all RM cell before forwarding it to the RM cell retransmitter, thus acting as a rate controlled, credit controlled, or integrated destination end system.

To illustrate the usage of the subject system, Pseudo code describing one possible implementation of a source end system using a credit enhanced PRCA with a step credit control function, a destination end system which sets EFCI bits and sends RM cells back to the source end system, and an credit enhanced intermediate systems as illustrated in FIG. 3 is given below.

Source End System
Parameters (per VC):
PCR   Peak Cell Rate
ICR   Initial Cell Rate
MCR   Minimum Cell Rate, the minimum for ACR
AIR   Additive Increase Rate (cells/unit_time)
MDF   Multiplicative Decrease Factor (used as 2^-MDF)

-continued

Nrm   One RM cell sent for every Nrm cells.
Cmax  Maximum credit value
Variables (per VC):
ACR            Allowed Cell Rate
ADR            Additive Decrease Rate
count          Number of cells sent.
next_cell_time The next opportunity for the VC to send a cell.
cell_sent (flag) If set, at least one cell was sent
C              Credit value
Input events (asynchronous):
o next_cell_time
o receive RM cell
RM cell fields:
ACR:  Available Cell Rate in effect when forward RM cell
      is sent
DIR:  Direction of the RM cell (forward or backward)
ER:   Explicit rate, initially set to PCR, and possibly modified
      downward by switches along the path
EFCI: Congestion Indicator (0 = no congestion, 1 =
      congestion)
CU:   Number of cells forwarded
PseudoCode:
Initialization
    Network assigns values to PCR, ICR, MCR, AIR,
    MDF, and Cmax.
    ACR = ICR
    count = 0
    cell_sent = 0
    ADR = ShiftR(ACR, MDF)
    C = Cmax
While VC_on_line do
if (now >= next_cell_time)
    if (ACR>ICR or cell_sent)
        ACR = max( ACR − ADR, MCR)
    if cell_to_send           ! Queue not empty
        send data cell with EFCI=0
        if (count mod Nrm = 0)
            send RM(ACR, DIR=forward, ER=PCR,
            EFCI=0, CU=count+Cmax)
            ADR = ShiftR(ACR, MDF)
        cell_sent = 1
        count = count + 1
    else cell_sent = 0
    next_cell_time = next_cell_time + 1/ACR
if receive RM(ACR, DIR=backward, ER, EFCI, CU)
    C = max (0, Cmax + CF − count)
    C = min (C, Cmax)
    if (C = 0)
        ACR = MCR (or 0)
    else if (EFCI = 0)
        ACR = ACR + Nrm*AIR + Nrm*ADR
        ACR = min(ACR, ER)
        ACR = min(ACR, PCR)
        ACR = max(ACR, MCR)
        next_cell_time = now + 1/ACR
    else if (ACR > ER)
        ACR = max(ER, MCR)
        next_cell_time = now + 1/ACR
Destination End System
PseudoCode:
    if(receive data cell)
        VC_EFCI = EFCI state of cell
    if(receive RM(ACR, DIR=forward, ER, EFCI, CU)
        if(VC_EFCI=1)
            EFCI = 1
        send RM(ACR, DIR = backward, ER, EFCI, CU)
Intermediate System
Parameters (per VC):
Cmax  Maximum credit value at this intermediate system
Variables (per VC):
count Number of cells sent
C     Credit value
PseudoCode:
Initialization
    C = Cmax
    count = 0
For each cell sent in the forward direction
    count = count + 1
For each RM cell received
    if (DIR = forward)

```
        forward the cell
    if (DIR=backward)
        C = max (0, Cmax+CF−count)
        CF = count
        if (C = 0)
            disable the transmission of VC
        if (C > 0)
            enable the transmission of VC
```

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. A system for controlling traffic in a digital communication network accommodating multiple types of flow control and having a number of nodes and connection paths between nodes established by switches at said nodes, with selected switches of said network having either rate-based or credit-based flow control systems, comprising:

a source end system at an upstream node of said system for controlling the transmission of cells of data along a connection path from said upstream node through an intermediate node of said network to a destination end system at a downstream node by adjusting the cell transmission rate of cells transmitted by said source end system, said source end system including means for transmitting resource management cells with said cells of data, said resource management cells containing at least one field having credit information and one field having rate information to accommodate the multiple types of flow control;

means at said intermediate node for writing information into at least one of said resource management cells for updating the corresponding resource management cell field to reflect the level of congestion at said intermediate node on a credit or rate basis and for transmitting said updated field to said upstream node, and means at said source end system for adjusting said cell transmission rate based on said updated field from said intermediate node, such that for intermediate nodes having different types of flow control, either credit based or rate based, resource management cells at said nodes are permitted to convey feedback information to said source end system regardless of the type of flow control.

2. The system of claim 1, wherein said credit information includes a credit value.

3. The system of claim 2 wherein said means for adjusting includes means for merging the credit values from all of the nodes associated with said connection path and for adjusting cell transmission rate or limiting cell transmission based on a merged credit value.

4. The System of claim 3 wherein said network includes at least one node downstream of said intermediate node and wherein said updating means includes means for merging the credit values associated with resource management cells received from said downstream node and means for generating resource management cells to be transmitted upstream.

5. The System of claim 3 wherein said source end system includes means for converting a credit value into a rate value and means for coupling said rate value to said adjusting means.

6. The System of claim 3, and further including means for selecting for adjusting said transmission rate to the lesser of the credit values associated with either a rate-based node or a credit-based node.

* * * * *